United States Patent
Fritz et al.

(10) Patent No.: US 10,442,438 B2
(45) Date of Patent: Oct. 15, 2019

(54) METHOD AND APPARATUS FOR DETECTING AND ASSESSING ROAD REFLECTIONS

(71) Applicant: Continental Teves AG & Co. oHG, Frankfurt (DE)

(72) Inventors: Stefan Fritz, Erzhausen (DE); Bernd Hartmann, Bad Homburg (DE); Manuel Amthor, Jena (DE); Joachim Denzler, Jena (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 113 days.

(21) Appl. No.: 15/572,010

(22) PCT Filed: May 4, 2016

(86) PCT No.: PCT/DE2016/200207
§ 371 (c)(1),
(2) Date: Nov. 6, 2017

(87) PCT Pub. No.: WO2016/177371
PCT Pub. Date: Nov. 10, 2016

(65) Prior Publication Data
US 2018/0141561 A1 May 24, 2018

(30) Foreign Application Priority Data

May 6, 2015 (DE) .................. 10 2015 208 429

(51) Int. Cl.
*G06T 7/55* (2017.01)
*B60W 40/06* (2012.01)
(Continued)

(52) U.S. Cl.
CPC .......... *B60W 40/06* (2013.01); *G06K 9/00791* (2013.01); *G06K 9/00798* (2013.01);
(Continued)

(58) Field of Classification Search
CPC .............. B60W 40/06; B60W 2550/14; G06K 9/00798; G06K 9/00791; G06K 9/4676;
(Continued)

(56) References Cited

U.S. PATENT DOCUMENTS

| 4,690,553 A | 9/1987 | Fukamizu et al. |
| 5,163,319 A | 11/1992 | Spies et al. |

(Continued)

FOREIGN PATENT DOCUMENTS

| CN | 1809853 A | 7/2006 |
| CN | 102017601 A | 4/2011 |

(Continued)

OTHER PUBLICATIONS

International Search Report of the International Searching Authority for International Application PCT/DE2016/200207, dated Sep. 7, 2016, 4 pages, European Patent Office, HV Rijswijk, Netherlands.

(Continued)

*Primary Examiner* — Amandeep Saini
(74) *Attorney, Agent, or Firm* — W. F. Fasse

(57) ABSTRACT

In a method for detecting and assessing reflections on a road (7), a camera (2) produces at least two digital images of at least one point (3) of the road, respectively from different recording perspectives (A, B) of the camera (2). Diffuse reflection and specular reflection of the road (7) are then detected by assessing differences in the appearances of the point (3) of the road in the at least two digital images using digital image processing algorithms. Road reflections are preferably assessed using an approximative approach. An item of road condition information is determined based on the detected reflection, preferably an item of road condition information which states whether the road is dry, wet, (Continued)

snow-covered or icy. Also provided are an apparatus (1) for carrying out the above-mentioned method, and a vehicle having such an apparatus.

14 Claims, 1 Drawing Sheet

(51) Int. Cl.
  *G06K 9/00* (2006.01)
  *G06K 9/46* (2006.01)
  *G06K 9/36* (2006.01)

(52) U.S. Cl.
  CPC ......... *G06K 9/4661* (2013.01); *G06K 9/4676* (2013.01); *G06T 7/55* (2017.01); *B60W 2550/14* (2013.01); *G06K 2009/363* (2013.01); *G06T 2207/30252* (2013.01)

(58) Field of Classification Search
  CPC .. G06K 9/4661; G06K 2009/363; G06T 7/55; G06T 2207/30252
  USPC .......................................................... 382/108
  See application file for complete search history.

(56) References Cited

U.S. PATENT DOCUMENTS

| 7,652,584 | B2 | 1/2010 | Fridthjof | |
|---|---|---|---|---|
| 8,184,194 | B2 | 5/2012 | Sato et al. | |
| 2002/0191837 | A1 | 12/2002 | Takeda et al. | |
| 2003/0141980 | A1* | 7/2003 | Moore | G08B 17/125 340/578 |
| 2013/0156301 | A1* | 6/2013 | Kang | G06K 9/00268 382/159 |
| 2015/0325014 | A1* | 11/2015 | Nakagawa | A61B 3/12 382/128 |
| 2017/0112057 | A1* | 4/2017 | Loukili | G06K 9/00791 |

FOREIGN PATENT DOCUMENTS

| DE | 30 23 444 | 7/1985 |
|---|---|---|
| DE | 42 35 104 | 4/1994 |
| DE | 112010005669 | 5/2013 |
| EP | 2 551 794 | 1/2013 |
| JP | 2003-057168 A | 2/2003 |
| WO | WO2004/081897 | 9/2004 |

OTHER PUBLICATIONS

English translation of PCT International Preliminary Report on Patentability of the International Searching Authority for International Application PCT/DE2016/200207, dated Nov. 9, 2017, 8 pages, International Bureau of WIPO, Geneva, Switzerland.

German Search Report for German Patent Application No. 10 2015 208 429.9, dated Mar. 22, 2016, 7 pages, Muenchen, Germany, with English translation, 5 pages.

Manuel Amthor et al., "Road Condition Estimation Based on Spatio-Temporal Reflection Models", Correct System Design, Springer International Publishing, Computer Vision Group, Friedrich Schiller University Jena, Germany, Advanced Engineering, Continental Teves AG & Co. oHG Frankfurt a.M., Germany, Nov. 3, 2015, XP047333260, ISSN: 0302-9743, ISBN: 978-3-642-36616-1, pp. 3 to 15.

Keiji Fujimura et al., "Road Surface Sensor", FUJITSU TEN GIHO—FUJITSU TEN Technical Report, FUJITSU TEN Kakushiki Gaisha, Kobe, Japan, Feb. 1, 1988, retrieved from the Internet on Dec. 4, 2012: URL:http://www.fujitsu-ten.com/business/technicaljournal/pdf/1-6E.pdf, XP002688511, ISSN: 0289-3789, pp. 64 to 72.

Shohei Kawai et al., "A Method to Distinguish Road Surface Conditions for Car-Mounted Camera Images at Night-Time", 2012 12$^{th}$ International Conference on ITS Telecommunications (ITST), IEEE, University of Toyama, Japan, Nov. 5, 2012, XP032327884, ISBN: 978-1-4673-3071-8, pp. 668 to 672.

Chinese Office Action in Chinese Patent Application No. 201680026128.2, dated Jun. 5, 2019, 6 pages, with partial English translation, 5 pages.

* cited by examiner

METHOD AND APPARATUS FOR DETECTING AND ASSESSING ROAD REFLECTIONS

FIELD OF THE INVENTION

The invention relates to a method for detecting and assessing reflections on a road. The invention also relates to an apparatus for carrying out the above-mentioned method and to a vehicle having such an apparatus.

BACKGROUND OF THE INVENTION

Technological progress in the field of optical image acquisition allows the use of camera-based driver assistance systems which are located behind the windshield and capture the area in front of the vehicle in the way the driver perceives it. The functionality of these systems ranges from automatic headlights to the detection and display of speed limits, lane departure warnings, and imminent collision warnings.

Starting from just capturing the area in front of the vehicle to a full 360° panoramic view, cameras can now be found in various applications and different functions for driver assistance systems in modern vehicles. It is the primary task of digital camera image processing as a standalone function or in conjunction with radar or lidar sensors to detect, classify, and track objects in the image section. Classic objects typically include various vehicles such as cars, trucks, two-wheel vehicles, or pedestrians. In addition, cameras detect traffic signs, lane markings, guardrails, free spaces, or other generic objects.

Automatic learning and detection of object categories and their instances is one of the most important tasks of digital image processing and represents the current state of the art. Due to the methods which are now very advanced and which can perform these tasks almost as well as a person, the focus has now shifted from a coarse localization to a precise localization of the objects.

Modern driver assistance systems use different sensors including video cameras to capture the area in front of the vehicle as accurately and robustly as possible. This environmental information, together with driving dynamics information from the vehicle (e.g. from inertia sensors) provide a good impression of the current driving state of the vehicle and the entire driving situation. This information can be used to derive the criticality of driving situations and to initiate the respective driver information/alerts or driving dynamic interventions through the brake and steering system.

However, since the available friction coefficient or road condition is not provided or cannot be designated in driver assistance systems, the times for issuing an alert or for intervention are in principle determined based on a dry road with a high adhesion coefficient between the tire and the road surface. This results in the problem that accident-preventing or at least impact-weakening systems warn the driver or intervene so late that accidents are prevented or accident impacts acceptably weakened only if the road is really dry. If, however, the road provides less adhesion due to moisture, snow, or even ice, an accident can no longer be prevented and the reduction of the impact of the accident does not have the desired effect.

SUMMARY OF THE INVENTION

It can therefore be the object of the present invention to provide a method and an apparatus of the type indicated above, with which the road condition or even the available friction coefficient of the road can be established so that driver alerts as well as system interventions can accordingly be effected in a more targeted manner and the effectiveness of accident-preventing driver assistance systems can be increased.

The object is achieved by the subject matter of the independent claims. Preferred embodiments are the subject matter of the subordinate claims.

The method according to a first aspect of the invention is used for detecting and assessing reflections of at least one point on a road. According to one method step, a camera is provided and is used to produce at least two digital images of the at least one point of the road, wherein the images are produced from different recording perspectives of the camera. Diffuse reflection and specular reflection of the road are then distinguished by assessing differences in the appearances of the at least one point of the road in the at least two digital images using digital image processing algorithms. An item of road condition information, in particular an item of road condition information which describes the friction coefficient of the road or which states whether the road is dry, wet or icy, is determined on the basis of the detected reflection.

The invention takes advantage of the fact that reflections can generally be divided into three categories and that each gives rise to different visual effects in the event of a change in the viewing angle or the perspective. In this case, a distinction is made between diffuse, glossy and specular reflection, wherein in the present invention the difference between diffuse reflection, which is an indicator of a dry road, and specular reflection, which is an indicator of a wet and/or icy road, is particularly of interest. In this way, the method according to the invention makes it possible to distinguish between dry and wet/icy roads.

The method according to the invention and the apparatus according to the invention use digital image processing algorithms, with the aim of robustly detecting road reflections in order to detect moisture and ice in particular. In this case, a conclusion can be drawn about a current road condition with the method according to the invention as a result of detecting and assessing reflections of even a single point of the road, which represents the road, in that specific features are sought in the images of the point of the road produced by the camera from two different perspectives using digital image processing algorithms, which features allow a conclusion to be drawn about the current road condition.

The method is preferably carried out in a sufficiently illuminated scene, which makes it possible to produce or record usable images. The prerequisite for the method is a change in the perspective in an image sequence of at least two images. In the case of diffuse reflections (indicator of a dry road) the change in the viewing angle does not have any visual effect on a fixed point on the road, since the light is reflected equally in all directions. In the event of a change in the perspective, the appearance does not change for the observer. In contrast thereto, in the case of a specular reflection (indicator of a wet and/or an icy road) the reflection is not bounced back in a scattered manner, the consequence of which is a considerable change in the appearance of a fixed point on the road in the event of a change in the viewing angle. The result of a change in perspective is that reflections in a specific point on the road no longer hit the viewer after the change. In order to exploit this effect it is basically necessary to track isolated or all of the points or regions in the image via a sequence of at least two images and to assess the change in appearance thereof.

The method according to the invention is preferably used in a vehicle. The camera can, in particular, be provided inside the vehicle, preferably behind the windshield, so that the area in front of the vehicle can be captured in the way the driver of the vehicle perceives it. The images can in this case be produced from two different perspectives in particular by a travel movement of the vehicle.

A digital camera is preferably provided, with which the at least two appearances can be directly recorded digitally and evaluated by means of digital image processing algorithms. In particular, a mono camera or a stereo camera can be used to produce the appearances since, depending on the characteristic, depth information from the image can also be used for the algorithm. It is preferably envisaged in connection with this that at least two digital images of the at least one point of the road are produced by means of the camera, wherein the images are produced from different recording perspectives with a stereo camera.

One particular advantage of the method according to the invention is that specular reflections can be reliably distinguished from shadows (diffuse reflections), as they show a different movement behavior in the image.

It can also be advantageously envisaged that diffuse and specular reflection are distinguished on the basis of digital image processing by differentiating between appearances fixed by the road and independent of the road caused by a relative movement of the observer and, therefore, a reliable separation of shadows and reflected infrastructure on the road is made possible.

One advantageous embodiment of the method according to the invention comprises the additional method steps of communicating the item of road condition information to a driver assistance system of a vehicle and adjusting times for issuing an alert or for intervention by means of the driver assistance system on the basis of the item of road condition information. The item of road condition information thus serves as an input for an accident-preventing driver assistance system of a vehicle, in order to be able to particularly effectively adjust times for issuing an alert or for intervention of the driver assistance system. The effectiveness of accident-preventing measures by such so-called advanced driver assistance systems (ADAS) can, as a result, be significantly increased.

Furthermore, it is also advantageously envisaged that the item of road condition information serves as important information regarding the driving surroundings during automating and is preferably fed to a corresponding system control device for autonomous driving. In this sense, it is envisaged according to another advantageous embodiment that the item of road condition information is incorporated into the function of an automated vehicle and the driving strategy as well as the establishment of handover points between an automated system and the driver are adjusted on the basis of the item of road condition information.

A further advantageous embodiment comprises the additional method steps of producing two digital images of a plurality of points of the road, which preferably form a trapezoidal region, from different perspectives by means of the camera and transforming the preferably trapezoidal region by means of an estimated homography into a rectangular top view. According to this embodiment, a region which comprises a plurality of points of the road is used in the images of the camera, which region represents the road, in order to detect road reflections. Depending on the running time and accuracy requirements the region can also be a segmented detail. However, a region in the form of a trapezoid is particularly preferable, wherein the trapezoidal region is transformed with the aid of an estimated homography into a rectangular top view ("bird's eye view"). Features which are particularly suitable for capturing the different appearance in this region on the basis of the presence of road reflections can be extracted with the aid of this transformation.

According to a particularly preferred embodiment, the camera is provided in a vehicle. The first image is produced in a first position of the vehicle from a first recording perspective. The vehicle is moved, e.g. driven, into a second position, wherein the second position differs from the first position, i.e. the first and the second positions do not coincide. The at least second image is then produced in the at least second position of the vehicle from an at least second recording perspective. The at least two images of the at least two different recording perspectives are subsequently transformed into a respective top view. The at least two top views produced are then registered with digital image processing means, incorporating driving dynamics parameters of the vehicle, and the appearances of the at least one point of the road in the at least two registered top views are compared. The registration can be carried out according to this embodiment example by a simple translation and rotation, as the scene has been transformed into a top view. The compensation can preferably be carried out or supported by incorporating individual driving dynamics parameters, e.g. vehicle speed, steering angle, etc. or entire models, e.g. ground plane model and driving dynamics models. The advantage of using this additional information is especially demonstrated in the case of a homogeneous or highly reflective road, in which case the vehicle movement can be misinterpreted on the basis of just image processing.

Furthermore, features of the at least one point of the road or the region, which features capture the change in the appearance in the at least two registered top views, are advantageously extracted. This is advantageously envisaged after assigning the individual points or regions to a sequence. The extracting can be done in different ways such as e.g. by means of the variance thereof or value progression in the form of a vector.

The individual features form a feature vector which is subsequently assigned to at least one class by a classification system (classifier). The classes are preferably "wet/icy" and "dry/remainder". A classifier in this case is a mapping of a feature descriptor on a discrete number that represents the classes to be detected.

A random decision forest is preferably used as a classifier. Decision trees are hierarchical classifiers which break down the classification problem iteratively. Starting at the root, a path towards a leaf node where the final classification decision is made is followed based on previous decisions. Due to the high learning complexity, very simple classifiers, so-called decision stumps, which separate the input parameter space orthogonally to a coordinate axis, are preferred for the inner nodes.

Decision forests are collections of decision trees which contain randomized elements preferably at two points in the training of the trees. First, every tree is trained with a random selection of training data, and second, only one random selection of permissible dimensions is used for each binary decision. Class histograms are stored in the leaf nodes which allow a maximum likelihood estimation with respect to the feature vectors that reach the leaf node during the training. Class histograms store the frequency with which a feature descriptor of a specific road condition reaches the respective leaf node while traveling through the decision tree. As a result, each class can preferably be assigned a probability that is calculated from the class histograms.

To make a decision about the presence of specular reflections for a feature descriptor, the most probable class from the class histogram is preferably used as the current condition, or other methods may be used, to transfer information from the decision trees into a decision about the presence of reflection.

An optimization step preferably follows this decision per input image. This optimization can take the temporal context or further information which is provided by the vehicle into account. The temporal context is preferably taken into account by using the most frequent class from a previous time period or by establishing the most frequent class by means of a so-called hysteresis threshold value method. The hysteresis threshold value method uses threshold values to control the change from one road condition into another. A change is made only when the probability of the new condition is high enough and the probability of the old condition is accordingly low.

If the extracting described above has been effected for the individual points or regions, it is additionally possible to extract features for an entire image section of one of the images, in particular a transformed image section. Various calculations are conceivable for this such as, for example, the concatenation of the individual point features with any dimension reduction measures (e.g. "principal component analysis"), description with the aid of statistical moments or even a "bag of visual words" approach, during which the occurrence of specific prototype values or value tuples (e.g. SIFT, HOG, LBPs etc.) is detected on the basis of a histogram.

Road reflections are particularly preferably assessed using the effects described above by means of an approximate approach, by means of which the robustness of the method can in particular be increased with image registration. At the same time running times can be reduced, which is essential for the automotive sector. In this sense, it is envisaged according to another advantageous embodiment that the at least two images produced, particularly preferably the top views produced, are averaged in order to obtain an average image and that an absolute or quadratic difference is calculated between each pixel in the average image and the associated column mean. A basic assumption of this embodiment is that a region moves through the entire image area. In the process, a specific region per se is not observed but the path traveled by it. Therefore, more than two images are particularly preferably produced. It is additionally assumed that a straight-line and steady change in the perspective exists, preferably a uniformly straight-line movement of the vehicle. This assumption can preferably be confirmed by vehicle movement parameters as contextual knowledge. On this understanding, the individual images, preferably the transformed individual images, are averaged from the sequence in order to obtain an average image. In order to minimize disk space or to give more recent events a higher weighting, it is also possible to calculate a moving average. The absolute difference or the quadratic difference is subsequently calculated between each pixel in the average image and the associated column mean.

Features of the average image can be extracted, taking account of the column means, wherein a "bag of visual words" approach is preferably applied, in which the occurrence of specific prototype values or value tuples is captured on the basis of a histogram. The resulting image can be used in order to assess the presence of specular reflections such as, for example, by means of statistical moments or in a particular advantageous form by means of local features (preferably a "local binary pattern") in a "bag of visual words" approach. The basis of this approximate approach is the assumption that regions passed on the road are very similar to the column mean during movement in a straight line in the case of diffuse reflection, whereas in the case of specular reflections the change in the appearance of the regions passed has considerable differences from the column means.

This method is substantially based—as mentioned above—on the assumption that the vehicle is moving in a straight line. During cornering, the viewed image region of the screen can be adjusted accordingly by rotation or shearing, in order to ensure that the effects still operate column by column even during cornering. In the case of this approach, the individual regions are not directly tracked, so to speak, in order to assess their change in appearance, but the path traveled by them (image columns) is analyzed. One advantage of this method is the robustness with respect to non-registered vehicle movements (pitching/rocking), which supplies error-free estimates in a particularly reliable manner. Another advantage is the required computing time which is greatly reduced in contrast to the first method. The calculations are in this case limited to calculating the average and some subtractions.

In addition, camera parameters are preferably incorporated into the assessment of the change in the appearances. As a result, the robustness of the method can be increased. The ever-changing exposure time, which causes changes in the appearance of the regions in the sequence (e.g. changes in brightness) and which can negatively affect the detection of reflections, is preferably taken into account.

The apparatus according to another aspect of the invention for detecting and assessing reflections of at least one point on a road comprises a camera which is set up to produce at least two digital images of the at least one point of the road from different recording perspectives. The apparatus is in this case set up to assess differences in the appearances of the at least one point of the road using digital image processing algorithms and, as a result, detect diffuse reflections and specular reflections of the road and determine an item of road condition information on the basis of the detected reflection.

With regard to the advantages and advantageous embodiments of the apparatus according to the invention, reference is made to the foregoing explanations in connection with the method according to the invention in order to avoid repetitions, wherein the apparatus according to the invention can have the necessary elements for this or can be set up for this in an extended manner.

Finally, the vehicle according to a further aspect of the invention comprises the aforementioned apparatus according to the invention.

BRIEF DESCRIPTION OF THE FIGURES

Embodiment examples of the invention will be explained in more detail below with reference to the drawing, wherein.

DETAILED DESCRIPTION OF EMBODIMENT EXAMPLES

Figure 1A:
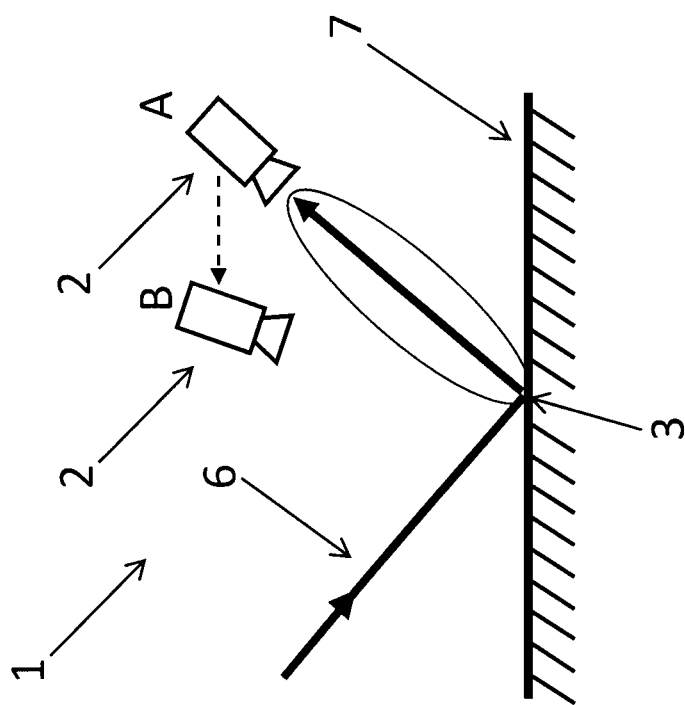
FIGS. 1a and b show a schematic representation of an embodiment example of an apparatus according to the invention during the execution of an embodiment example of the method according to the invention.
Figure 1B:
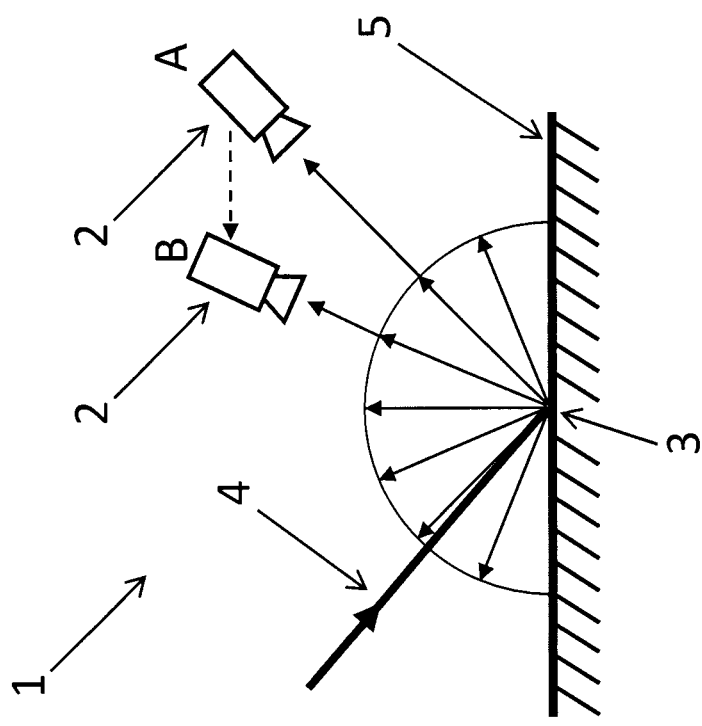

The apparatus 1 according to the invention shown by FIGS. 1a and 1b comprises a digital camera 2 which is set up to record at least two digital images of a point 3 of the road from different recording perspectives, wherein the different recording perspectives are each shown by two different positions A and B of the respective camera 2.

The camera 2 is arranged in a vehicle (not shown), and is in fact located behind the windshield thereof, so that the area in front of the vehicle can be captured in the way the driver of the vehicle perceives it. By means of a travel movement of the vehicle, said vehicle is moved from a first position into a second position. In the first position, in which the camera 2 covers the recording perspective A shown on the right in FIGS. 1*a* and 1*b* respectively, a first image of the point 3 of the road is recorded in each case. The vehicle is moved into the second position in which the recording perspective of the camera 2 is compensated in such a manner that the recording perspective shown on the left in FIGS. 1*a* and 1*b* respectively is covered, from which a second image of the point (3) of the road is recorded in each case.

As can be seen from FIG. 1*a*, the image of the point 3 of the road does not change during the change of the recording perspective from A to B, because an incoming light beam 4 is reflected equally in all directions by a dry road surface 5. This corresponds to a diffuse reflection which is an indicator of a dry road surface. The apparatus 1 compares the first and the second image with each other. Using digital image processing algorithms, the apparatus 1 detects that the first and the second image do not differ or only differ to an extent that a diffuse reflection must exist. Due to the identified or detected diffuse reflection, the apparatus 1 determines an item of road condition information which includes the fact that the road surface 5 is dry. This value is transmitted to a driver assistance system (not shown).

On the other hand, the image of the point 3 of the road changes, as can be seen from FIG. 1*b*, during the change of the recording perspective from A to B, because an incoming light ray 6 is only reflected in a particular direction by an icy or wet road surface 7. This corresponds to a specular reflection which is an indicator of a wet or icy road surface. The apparatus 1 compares the first and the second image with each other. By using digital image processing algorithms the apparatus detects that the first and the second image vary greatly from each other such that a specular reflection must exist. Due to the identified or detected specular reflection, the apparatus determines an item of road condition information which includes the fact that the road surface is wet or icy. This value is transmitted to a driver assistance system (not shown) which adjusts the times for issuing an alert or for intervention to the wet or icy road surface.

The invention claimed is:

1. A method for detecting and assessing reflections of at least one point on a road, comprising the method steps:
    providing a camera;
    producing at least two digital images of the at least one point of the road by the camera, wherein the images are produced from different recording perspectives of the camera;
    distinguishing diffuse reflection and specular reflection of the road by assessing differences in appearances of the at least one point of the road in the at least two digital images using digital image processing algorithms; and
    determining an item of road condition information based on the distinguished reflection;
    wherein the at least two images are averaged to produce an average image, and wherein an absolute difference or a quadratic difference is calculated between each pixel in the average image and an associated image column mean value.

2. The method according to claim 1, characterized by producing the at least two digital images of the at least one point of the road by the camera which is a stereo camera, wherein the images are produced from the different recording perspectives of imaging elements of the stereo camera.

3. The method according to claim 1, characterized by
    distinguishing between the diffuse reflection and the specular reflection based on digital image processing by differentiating between appearances fixed by the road and independent of the road caused by the relative movement of the camera, therefore
    reliably separating shadows and reflected infrastructure on the road.

4. The method according to claim 1, characterized by
    communicating the item of road condition information to a driver assistance system of a vehicle, and
    adjusting times for issuing an alert or for intervention by the driver assistance system based on the item of road condition information.

5. The method according to claim 1, characterized by
    incorporating the item of road condition information into a function of an automated vehicle, and
    adjusting a driving strategy and establishing handover points between an automated system and a driver based on the item of road condition information.

6. The method according to claim 1, characterized by
    producing the at least two digital images of a plurality of the points of the road, which form a trapezoidal region, from the different recording perspectives by the camera, and
    transforming the trapezoidal region by an estimated homography into a rectangular top view.

7. The method according to claim 1, characterized by
    providing the camera in a vehicle;
    producing a first one of the digital images in a first position of the vehicle from a first one of the recording perspectives;
    moving the vehicle into a second position which differs from the first position;
    producing a second one of the digital images in the second position of the vehicle from a second one of the recording perspectives;
    transforming the at least two digital images from the different recording perspectives respectively into at least two top views;
    registering the at least two top views produced with digital image processing, incorporating driving dynamics parameters of the vehicle; and
    comparing the appearances of the at least one point of the road in the at least two registered top views.

8. The method according to claim 7, characterized by extracting features of the at least one point of the road, which features capture a change in the appearance in the at least two registered top views.

9. The method according to claim 8, characterized by forming a feature vector from the extracted features, and assigning the feature vector to a class by a classifier.

10. The method according to claim 7, characterized by producing the average image by averaging the at least two top views.

11. The method according to claim 1, characterized by extracting features of the average image, taking account of the image column mean values, during which an occurrence of particular prototype values or value tuples is captured based on a histogram.

12. The method according to claim 1, characterized by incorporating camera parameters of the camera into the assessing of the differences in the appearances.

13. An apparatus for detecting and assessing reflections of at least one point on a road, comprising a camera which is configured to produce at least two digital images of the at least one point of the road from different recording perspectives,
  wherein the apparatus is configured to:
  assess differences in appearances of the at least one point of the road using digital image processing algorithms and, as a result, detect diffuse reflections and specular reflections of the road,
  determine an item of road condition information based on the detected reflection,
  average the at least two images to produce an average image, and
  calculate an absolute difference or a quadratic difference between each pixel in the average image and an associated image column mean value.

14. A combination comprising the apparatus according to claim 13 and a vehicle.

* * * * *